Jan. 8, 1929.
G. R. BROWN
1,698,389
MEANS FOR ELECTRIC CURRENT DISTRIBUTION
Filed Aug. 31, 1926   3 Sheets-Sheet 1
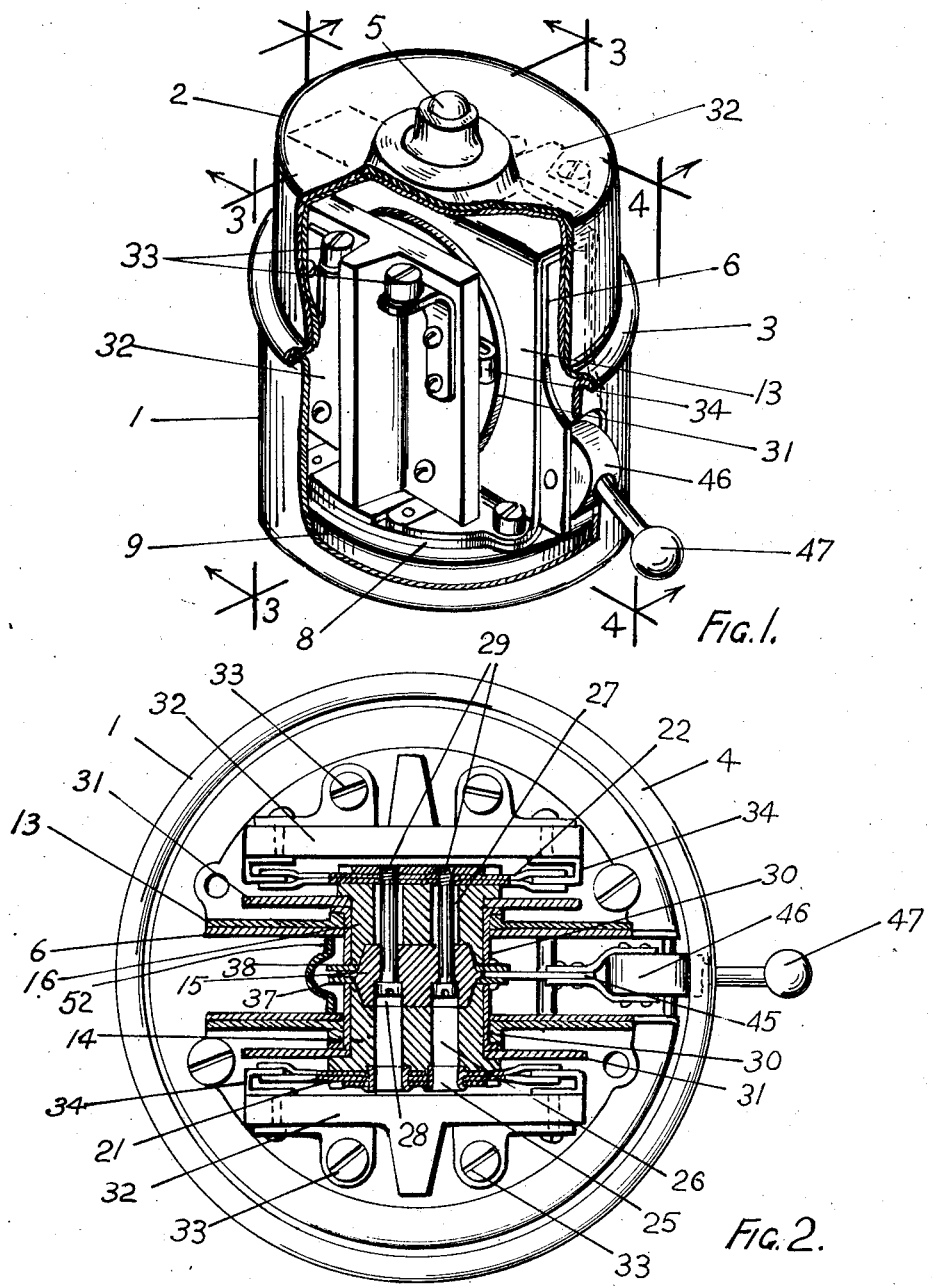

Jan. 8, 1929.  
G. R. BROWN  
1,698,389  
MEANS FOR ELECTRIC CURRENT DISTRIBUTION  
Filed Aug. 31, 1926  3 Sheets-Sheet 2

George Rudston Brown  
INVENTOR

Jan. 8, 1929.
G. R. BROWN
1,698,389
MEANS FOR ELECTRIC CURRENT DISTRIBUTION
Filed Aug. 31, 1926   3 Sheets-Sheet 3
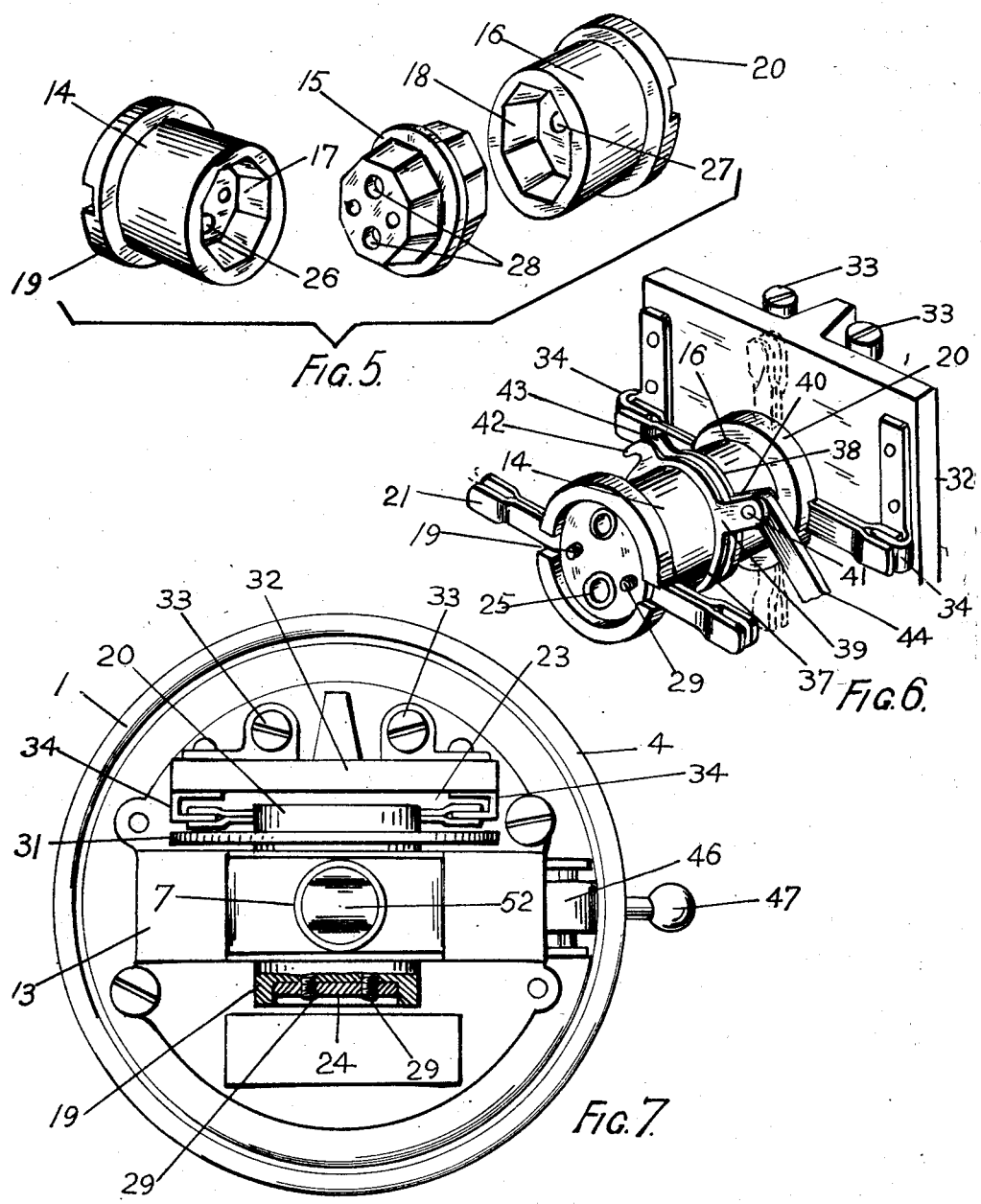
George Rudston Brown Patented Jan. 8, 1929.

1,698,389

UNITED STATES PATENT OFFICE.

GEORGE RUDSTON BROWN, OF CROYDON, NEAR SYDNEY, NEW SOUTH WALES, AUSTRALIA.

MEANS FOR ELECTRIC-CURRENT DISTRIBUTION.

Application filed August 31, 1926, Serial No. 132,716, and in Australia October 2, 1925.

This invention relates to means which are usable in connection with electric current distribution. The object of the invention is to provide devices for electric current distribution which are interchangeable and which are readily assembled and disassembled.

The invention comprises means consisting of a base of metal formed to receive a detachable metal cover and devices adapted to be enclosed by such base and cover to which electric lead wires may be led. It also comprises means whereby certain of the said devices are operatable for the purpose of controlling electric current.

Said base and cover may be of any suitable design or shape and within same is located an element constructed to receive at its head a cap piece designed to serve as a union connection for securing the cover to the base. Lateral flanges may extend from such element and one surface thereof may carry insulating material. The said element is provided with an opening to receive therein electrical insulating components mounted for rotation in said element, portion or portions of such components carrying electric conductive contact means. Such insulating components are preferably made in three separate parts.

On the element may be mounted in any preferred manner insulating blocks of approved design carrying terminals. Combinations such as a one pole switch, double pole switch or a combined one pole switch and fuse may be arranged by suitably disposing desired blocks in association with the element whereby electric current may be controlled.

Leads wires can be carried to the means associated with the element through any suitable devices associated with the base.

Figure 3:
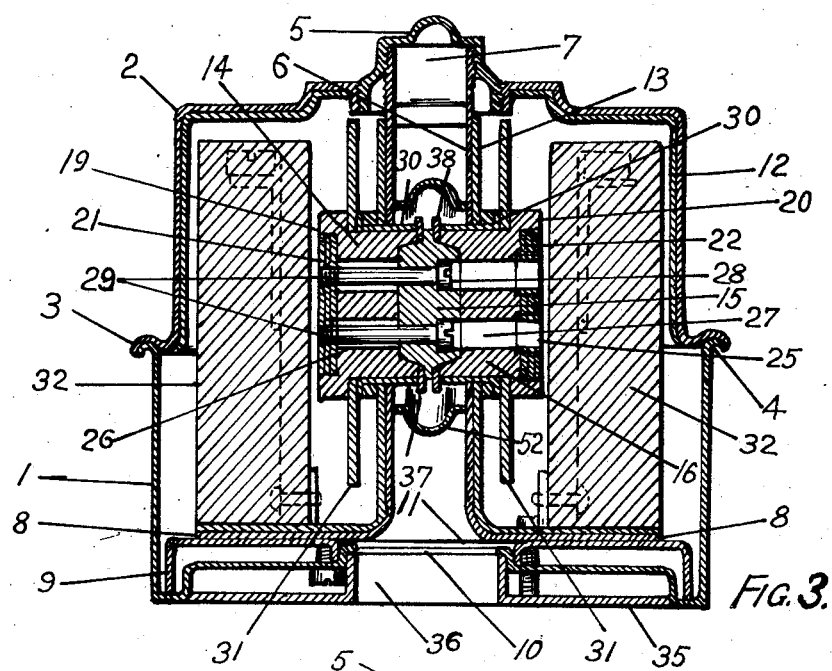
Figure 4:
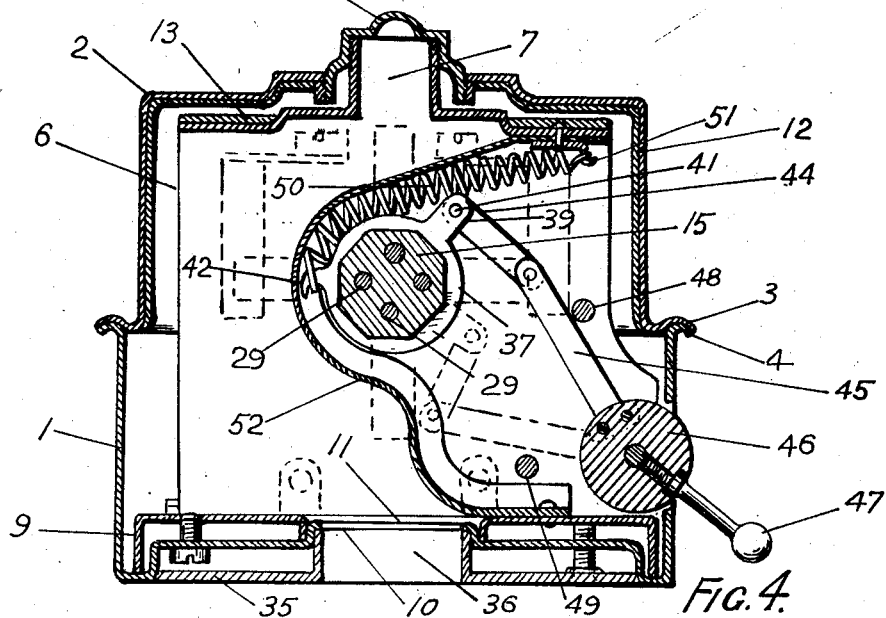

Referring to the accompanying drawings in which the invention is illustrated, Fig. 1 is a perspective view of one form of the apparatus; Fig. 2 sectional plan thereof with cover removed; Figs. 3 and 4 sectional elevations on plane 3—3 and 4—4, Fig. 1; Fig. 5 perspective view of insulated components associable with the element but shown segregated from each other; Fig. 6 detail perspective view of the insulated components assembled for use in connection with a double pole switch; and Fig. 7 plan view of the apparatus designed as a single pole switch and fuse with cover removed.

A suitable metal casing which may consist of the base 1 and cover 2 is furnished. The cover 2 may have the rim flange 3 to abut the rim flange 4 on the base 1 when the union cap 5 is screwed onto the through neck 7 on the element 6 and the cover 2 is screwed onto the cap 5. Said cap 5 is externally screw-threaded to receive the cover 2 and internally screw-threaded to enable it to be fitted to the neck 7. It is preferred to construct the element 6 of metal and to U-shape with lateral foot flanges 8 adapted to be suitably secured to a foot plate 9 designed to be attached to the bottom of the base 1, such bottom having a through opening 10 therein and the plate 9 also having an opening 11 therein registering with the opening 10. Electrical insulating material 12 is preferably provided for the interior of the cover 2 and electrical insulating material 13 is also preferably provided for the outer surface of the element 6.

In the side walls of the element 6 are openings to receive the components 14, 15, and 16 (Fig. 5) which when assembled (Fig. 6) are carried in the said openings in the walls of the element 6 (Figs. 2 and 3). The said components are designed so that they may be readily assembled with and disassembled from each other and also that they may be turned as a unit when assembled together and disposed in the openings therefor in the element 6. The component 15 is formed as a spigot to fit recesses in the components 14 and 16; the opposite ends of the component 15 are faced to octagonal or other suitable form to fit the corresponding recesses 17 and 18 in the respective components 14 and 16. Further, the ends 19 and 20 of the respective components 14 and 16 are recessed to receive electric conductive plates 21 and 22 (Fig. 2) or the electric conductive plate 23 and disc 24 (Fig. 7). Such plates 21 and 22 as well as the plate 23 are in two pieces which pieces may be secured together by rivets 25.

Through holes 26 are provided in the component 14, and through holes 27 are provided in the component 16, while through holes 28 are provided in the component 15. Such through holes are intended to receive securing screws 29, the screws entering either the plates 21, 22, and 23 or 24 as these may be furnished in association with the components 14, 15 and 16. In Figs. 2 and 6 the plates 21 and 22 are shown in relation to the components 14, 15 and 16, the apparatus shown in such figures being designed for a double pole switch, while in Fig. 7 the plate 23 is shown as well as the disc plate 24 in association with the said components, the apparatus in such case being designed for a single pole switch with associated fuse block.

It is preferred to furnish metal bearing sleeves 30 for the components 14 and 16. Electrical insulating shield plates 31 may also be attached to the components 14 and 16. An electrical insulating block or blocks 32 (Figs. 2 and 7) carrying electrical conductive terminal means 33 may be suitably attached to the element 6; these terminal means have electrically associated therewith the electric conductive contact hooks 34 with which the plates 21, 22 and 23 may engage when the jawed ends of such plates are juxtaposed thereto. The bottom of the base 1 may have attached thereto a base plate 35 with through neck 36 registering with the openings 10 and 11 respectively in the bottom of the base 1 and in the foot plate 9; such plate 35 may serve for securing the electrical distribution apparatus to a suitable support and electrical lead connections may be made to the apparatus through the neck 36 and openings 10 and 11.

Any suitable means may be provided for turning the components 14, 15 and 16 when assembled as a unit for the purpose of turning the apparatus to "on" or "off" position. In Figs. 4 and 6 one design of such means is shown, the component 15 having associated therewith so that they will not be turnable thereon the rings 37 and 38 which carry the arms 39 and 40 which are joined by the pin 41. Such rings also have the hooks 42 and 43. The pin 41 has pivotally attached thereto one end of the link 44 the other end of which is pivotally connected to one end of another link 45 whose other end is secured to globular tilting means 46 to which is secured the knobbed tilting handle 47 which projects outwardly of the means 46 and exteriorly of the base 1. Stop pins 48 and 49 respectively are provided in the element 6 for the links 44 and 45. In the "on" position the links 44 and 45 may be positioned as shown in full lines, Figs. 4 and 6, but when in the "off" position the links 44 and 45 may be positioned as shown in dotted lines in Fig. 4.

A shield 52 may be furnished within the element 6 and secured at its opposite ends respectively to the element 6 and the foot plate 9. Such shield serves to protect the electric lead wires coming into contact with the operative means for turning the components 14, 15 and 16 as well as such components. The coil spring 50 is attached at one end to the hook 51 secured to the element 6 and at the other end to the hooks 42 and 43 on the rings 37 and 38, whereby when the components 14, 15 and 16 are turned to place the apparatus either in the "on" or "off" position such spring will serve to permit snapping home of the components 14, 15 and 16 and temporarily holding them with their contact plates 21, 22 or 23 in proper relation determined by the moving of the knobbed handle 47.

What I claim as my invention and desire to secure by Letters Patent is:—

1. Means for electric current distribution, comprising a metal casing consisting of a separable cover and a base, the latter having an opening therein for electric current leads, an element within said casing upon which electric conductive terminal means are attachable, a neck on said element adapted to receive a union connection the latter also being adapted to be connected to the cover and to serve in detachably securing the cover to the base, turnable means associated with openings in the element the said turnable means being constructed of three interlocking components of electric insulating material and carrying electric conductive means whereby current is controllable through the turning of said turnable means to bring said electric conductive means into contact or non-contact relation with said turnable means, and means for turning said turnable means.

2. Means for electric current distribution according to claim 1, in which one of the components of the turnable means is formed to serve as a spigot whereby opposite ends thereof will non-rotatably fit recesses in the other respective components upon the assembling of the three components, and whereby when the assembled components are associated with the element they can be turned in the openings therein as one unit.

3. Means for electric current distribution according to claim 1, in which one of the components of the turnable means is formed to serve as a spigot whereby opposite ends thereof will non-rotatably fit recesses in the other respective components upon the assembling of the three components, and whereby when the assembled components are associated with the element they can be turned in the openings therein as one unit, the three components having through openings therein to receive securing screws, the latter being also securable to the electric conductive means associated with the assembled components.

4. Means for electric current distribution according to claim 1, in which one of the components of the turnable means is formed to serve as a spigot whereby opposite ends thereof will non-rotatably fit recesses in the other respective components upon the assembling of the three components, and whereby when the assembled components are associated with the element they can be turned in the openings therein as one unit, the two components other than the spigot component being furnished with bearing surfaces to fit the openings in the element.

5. Means for electric current distribution according to claim 1, in which the turnable means carry shields of electrical insulating material disposed at the opposite ends of the turnable means.

6. Means for electric current distribution according to claim 1, in which the turnable means are turnable by means of a globular tilter pivotally supported in the base and connected to link means associated with means on the turnable means, said tilter having an operative extension projecting outwardly of the base.

In testimony whereof I affix my signature.

GEORGE RUDSTON BROWN.